UNITED STATES PATENT OFFICE.

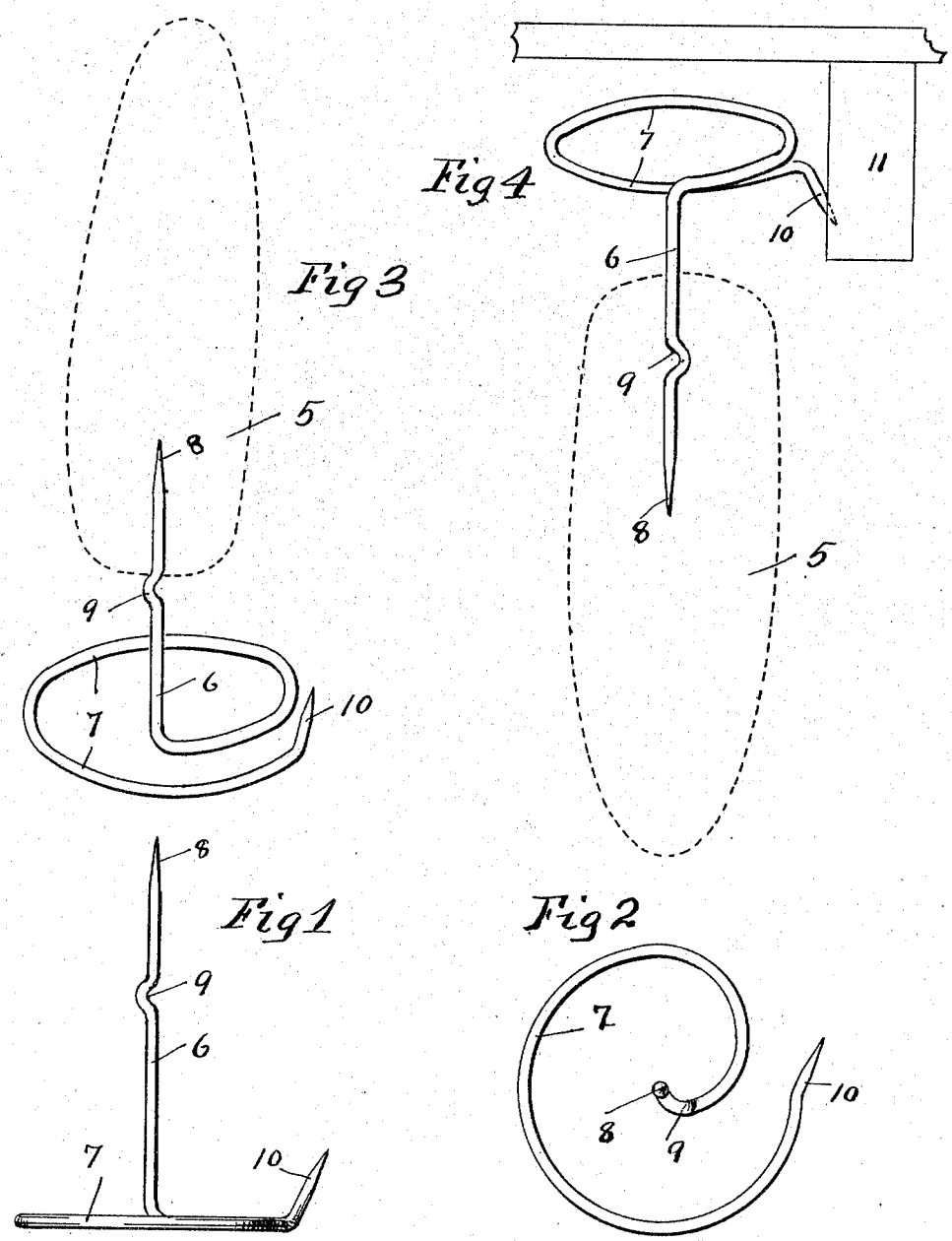

JOHN OFTEDAHL, OF HANLEY FALLS, MINNESOTA.

SEED-CORN HOLDER.

1,308,253.

Specification of Letters Patent.

Patented July 1, 1919.

Application filed August 12, 1918. Serial No. 249,484.

*To all whom it may concern:*

Be it known that I, JOHN OFTEDAHL, a citizen of the United States, residing at Hanley Falls, in the county of Yellow Medicine and State of Minnesota, have invented certain new and useful Improvements in Seed-Corn Holders; and I do hereby declare the following to be a full, clear, and exact description of the invention, such as will enable others skilled in the art to which it appertains to make and use the same.

My invention has for its object to provide an improved holder, by means of which, ears of seed corn may be set up endwise and supported from the floor or other horizontal surface, or may be hung from an overhead support, such as the rafters, joist, or even the wall of a building.

To the above ends, generally stated, the invention consists of the novel construction and arrangement of parts hereinafter described and defined in the claims.

The improved device is made from a single piece of wire bent into such form that one end thereof may be stuck into one end of the cob of the seed ear, and the end thereof is so formed as to form a supporting base and an anchoring barb.

The invention is illustrated in the accompanying drawings wherein like characters indicate like parts throughout the several views. Referring to the drawings, Figure 1 is a side elevation of the improved holder;

Fig. 2 is a plan view thereof;

Fig. 3 is a perspective view showing the holder in use to support an ear in an upturned position; and Fig. 4 is a perspective view showing the holder applied to hang the ear from an overhead support.

In the drawings, the ear of seed corn is indicated by the numeral 5. The holder, which, as stated, is made up from a single piece of wire, preferably a spring tempered steel wire, bent to form an upright stem or end 6, and a spiral base 7. The stem 6 terminates with a sharp point at 8 and a considerable distance from said point is formed with a lateral bend or kink 9. The end of the base forming coil 7 is extended and turned upward obliquely to form an anchoring bar 10.

In Fig. 4, the numeral 11 indicates a floor joist which is usually found to be of pine, so that the barb 10 may be quite readily stuck into the same, as shown in Fig. 4.

When the ear is to be supported from the floor, or horizontal support, projecting upward, the barb 8 will be inserted into the pith of the corn cob approximately as far as the kink 9 and the kink 9 will then hold the cob against sliding farther downward on to the stem. The holder being then set on its base 7, the cob will be supported in an upright position far enough above the floor so that mice cannot get at the corn.

When it is desired to hang the cob from an overhead support, the stem 6 is inserted farther into the pith of the cob so that the kink 9 is carried into the cob, and then the holder is turned slightly so that the kinked portion will cut its way into the pith of the cob and hold the cob so that it will not accidentally fall off from the stem when the holder is inverted, as shown in Fig. 4. The barb 10 being then inserted slightly into the joist 11 or into any other wooden or soft overhead support, the cob will be suspended, as shown in Fig. 4.

The so-called seed corn holder is of very small cost, and as above noted, may as well be used in either of two ways described. In either instance, the cobs of corn will be supported in such a way that air will freely circulate around the same, thereby insuring against mold and facilitating drying. Moreover, the seed corn will be protected against rodents and mice.

Seed corn, as is well known to those familiar in the matter, must be very thoroughly dried and must not be allowed to freeze before it is thoroughly dried, for if it does, it will not germinate, or in other words, will not grow when planted. For this reason it has become a very general practice with farmers to store their seed corn in the attics or various other dry places in their own dwellings where it will be kept from freezing while thoroughly drying; and in thus storing it, two difficulties have been experienced, to wit, there has been a large waste due to mice, and the corn, when packed together, would not thoroughly dry and would frequently become moldy. Both of these difficulties are entirely overcome by the use of the improved holder.

What I claim is:

1. A seed corn holder constructed from a single piece of wire bent to form a stem and a spiral base, said stem being insertible into the pith of the cob, and said base being adapted to rest upon a horizontal support, said base, at the end of its spiral having a projecting barb adapting it to be hung from an overhead support.

2. A seed corn holder constructed from a single piece of wire bent to form a stem and a spiral base, said stem being insertible into the pith of the cob, and said base being adapted to rest upon a horizontal support, said base, at the end of its spiral having a projecting barb adapting it to be hung from an overhead support, and said stem having a lateral kink below its ends.

3. A seed corn holder constructed from a single piece of wire bent to form a stem and a laterally projected barb, said stem being insertible into the pith of the cob, and said barb being engageable with an overhead support, the said stem also having a lateral kink for the purpose set forth.

In testimony whereof I affix my signature in presence of two witnesses.

JOHN OFTEDAHL.

Witnesses:
CLARA DEMAREST,
BERNICE G. BAUMANN.

Copies of this patent may be obtained for five cents each, by addressing the "Commissioner of Patents, Washington, D. C."